(12) United States Patent
Allen

(10) Patent No.: US 9,699,142 B1
(45) Date of Patent: Jul. 4, 2017

(54) CROSS-SITE SCRIPTING DEFENSE USING DOCUMENT OBJECT MODEL TEMPLATE

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/272,230

(22) Filed: May 7, 2014

(51) Int. Cl.
*H04L 29/06* (2006.01)
*G06F 21/56* (2013.01)

(52) U.S. Cl.
CPC ........ *H04L 63/0245* (2013.01); *G06F 21/563* (2013.01); *H04L 63/1433* (2013.01)

(58) Field of Classification Search
CPC ..... H04L 63/00; H04L 63/14; H04L 63/1433; H04L 63/1441; H04L 63/1466; H04L 63/1483; H04L 63/16; H04L 63/168; H04L 63/02; H04L 63/0227; H04L 63/0245; H04L 63/1425; G06F 21/00; G06F 21/50; G06F 21/51; G06F 21/55; G06F 21/56; G06F 21/562; G06F 21/564; G06F 21/57; G06F 21/577; G06F 21/563
See application file for complete search history.

(56) References Cited

U.S. PATENT DOCUMENTS

| | | | | |
|---|---|---|---|---|
| 8,601,565 B1 * | 12/2013 | Sakata | G06F 21/00 726/11 |
| 2010/0199170 A1 * | 8/2010 | Hoffman | H04L 63/1416 715/234 |
| 2011/0185427 A1 * | 7/2011 | Aciicmez | G06F 21/53 726/24 |
| 2011/0197177 A1 * | 8/2011 | Mony | G06F 8/51 717/115 |
| 2013/0081135 A1 * | 3/2013 | Podjarny | H04L 63/1441 726/22 |
| 2013/0111584 A1 * | 5/2013 | Coppock | H04L 63/145 726/22 |
| 2014/0075563 A1 * | 3/2014 | Simpson | G06F 21/577 726/25 |
| 2015/0007251 A1 * | 1/2015 | Johns | H04L 63/20 726/1 |
| 2015/0304337 A1 * | 10/2015 | Nguyen-Tuong | G06F 21/51 726/1 |

OTHER PUBLICATIONS

Pierre Geneves et al., Logic-Based XPath Optimization, 2004, ACM, DocEng'04, pp. 211-219.*

* cited by examiner

*Primary Examiner* — Jung Kim
*Assistant Examiner* — Adrian Stoica
(74) *Attorney, Agent, or Firm* — Davis Wright Tremaine LLP

(57) ABSTRACT

Method and apparatus for cross-site scripting defense using document object model template are disclosed. In the method and apparatus, a document object model template is generated based at least in part on representative information for web content. The document object model template is provided for use in determining whether received web content is permissible.

22 Claims, 8 Drawing Sheets

CROSS-SITE SCRIPTING DEFENSE USING DOCUMENT OBJECT MODEL TEMPLATE

BACKGROUND

Browser security may include trust-based techniques that use same-origin content policies. A same-origin content policy may grant content privileges based at least in part on the content having been received from a particular location. Cross-site scripting attacks may seek to obtain privileges by injecting malicious material into content hosted by a site that contains other non-malicious information. For example, a cross-site scripting attack may induce a website to include script code controlled by an attacker on either a persistent or non-persistent basis. Existing techniques for deterring these attacks, such as restricting the locations from which script code may be sourced or restricting the actions that script code may perform, are not sufficient at protecting against new ways of delivering script code.

Accordingly, it is often challenging to defend against cross-site scripting attacks by detecting abnormalities in resulting content documents. It is also challenging to better protect against unanticipated ways of delivering script code or script code cloaking anti-security technologies.

BRIEF DESCRIPTION OF THE DRAWINGS

Various embodiments in accordance with the present disclosure will be described with reference to the drawings, in which.

DETAILED DESCRIPTION

Figure 1:
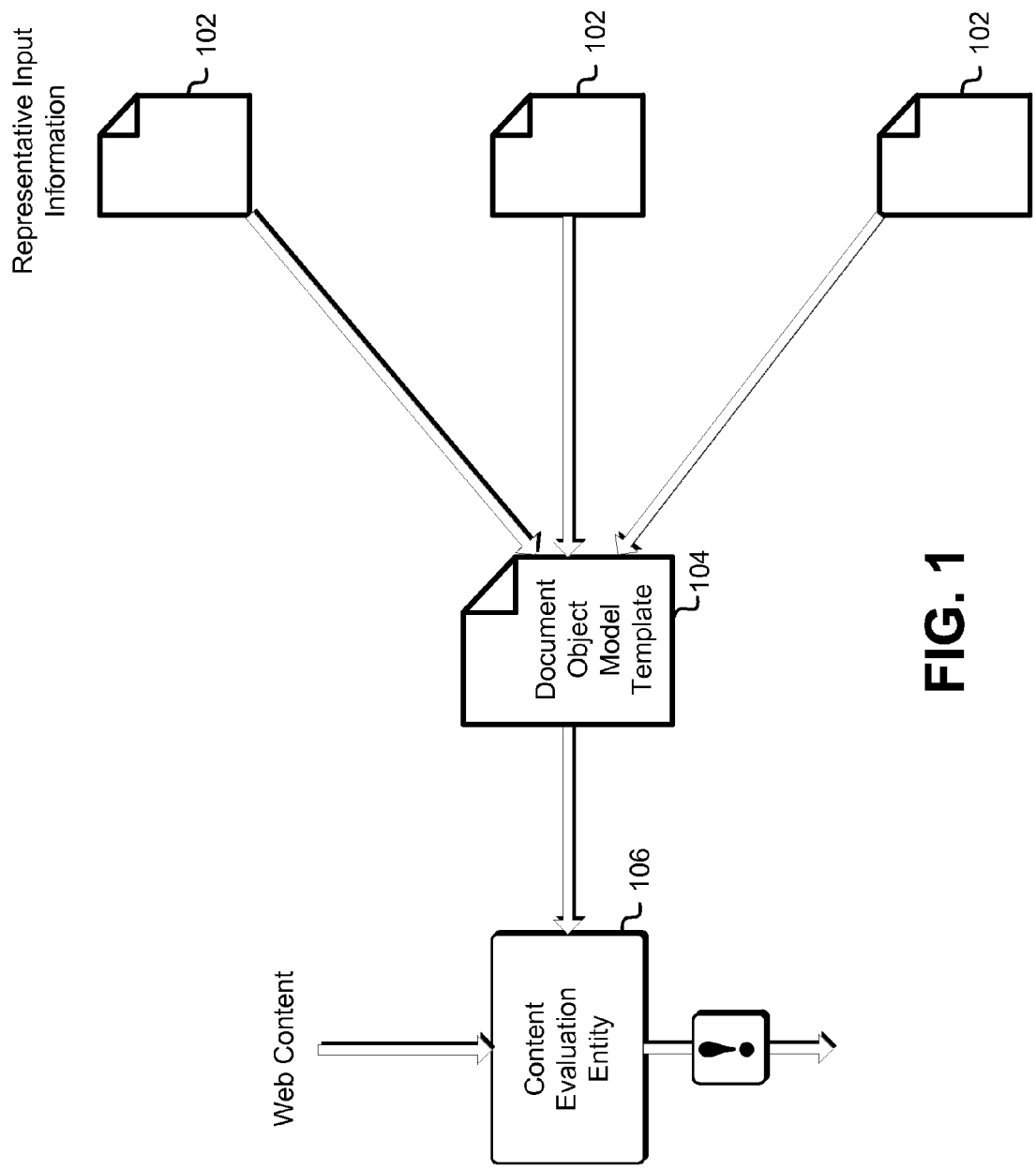
FIG. 1 shows an example of evaluating content using a document object model template in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include defending against cross-site scripting attacks. A cross-site scripting attack may seek to inject content, such as a script or a code, in legitimate web content for a malicious purpose. For example, the injected content in a cross-site scripting attack may be used for implementing spyware or adware. A client device, such as a laptop or desktop computer, used to navigate a trusted website may be inadvertently infected due to the cross-site scripting attack being successful.

Web content may be specified or described using scripting language, such as JavaScript, or a markup language, such as hypertext markup language (HTML) or extensible markup language (XML), among others. A document object model format may be used to facilitate web content description. The document object model format may be hierarchal or may have a tree-like structure, whereby the document object model may specify various nodes of the document. The document object model may specify the relationship between the nodes, which may include body element nodes, form nodes, filter nodes, image nodes or link nodes, among others.

It may be expected that certain webpages or certain web content (for example, web content that is provided by a content provider) have document object models having logical structures that are in common with one another. This logical structure may often cause the webpages or the content to have a common style, formatting or layout across when rendered using a client device application, such as a web browsing application. The document object models of web content pertaining to the same content provider or to webpages of the same website may have similar nodes or similar relationships between the nodes. Due to fact that in cross-site scripting attacks, malicious content may be injected by a third-party in content that is authored or provided by a content provider, commonalities between legitimate web content (for example, as authored by a content provider) may be used to identify malicious content and guard against cross-site scripting attacks.

As described herein, representative information for legitimate web content may be received and one or more document object model snapshots may be generated based at least in part on the representative information. The one or more document object model snapshots may capture a structure of the web content and relationships between its various nodes. For example, the document object model snapshots may capture the type of nodes used in constructing the web content and any parent-child relationship between the nodes. A document object model snapshot may define a logical structure of a document. As described herein, the term "document" may refer to any structured piece of information. For example, the document may be a webpage described using HTML, XML or JavaScript and the document object model snapshot may specify various elements or content of the document. The document object model snapshot may specify text nodes, scripts or data sections of the document. The document object model snapshot may describe an element tree of the document and set forth logical relationship between the various tree elements.

Based at least in part on the one or more document object model snapshots, a document object model template may be generated. The document object model template may be used as a baseline or framework for legitimate webpages. The document object model template may specify permitted document object model characteristics for a website. The document object model template may specify a location, number, arrangement or relationship of text nodes, scripts, data sections, processing instructions, entity references or content elements, among others. The document object model template may specify permissible document object model characteristics. The document object model template may be used to evaluate further web content. The web content may be deemed to be non-malicious if the web content is in accordance or complies with the document object model template. Conversely, web content that is outside the boundaries of what is permitted by the document object model template may be deemed to be suspicious or malicious and appropriate mitigating action may be taken accordingly.

FIG. 1 shows an example of evaluating content using a document object model template in accordance with at least one embodiment. Representative input information 102 for web content is used to produce a document object model template 104. The representative input information 102 may be the content of various web pages of a website (for example, specified using HTML or JavaScript) that is sought to be executed (for example, using a web browsing application). Furthermore, the representative input information 102 may be test inputs for a website pending execution. The document object model template 104 may specify attributes or characteristics of permissible content or impermissible content as determined based at least in part on the representative input information 102. For example, permissible content may be expected to have attributes that are found in the representative input information 102, whereas content having attributes not found in the representative input information 102 may be deemed as impermissible. Following producing the document object model template 104, the document object model template 104 is used by a content evaluation entity 106 in determining whether received web content is permissible per the document object model template 104.

Figure 2:
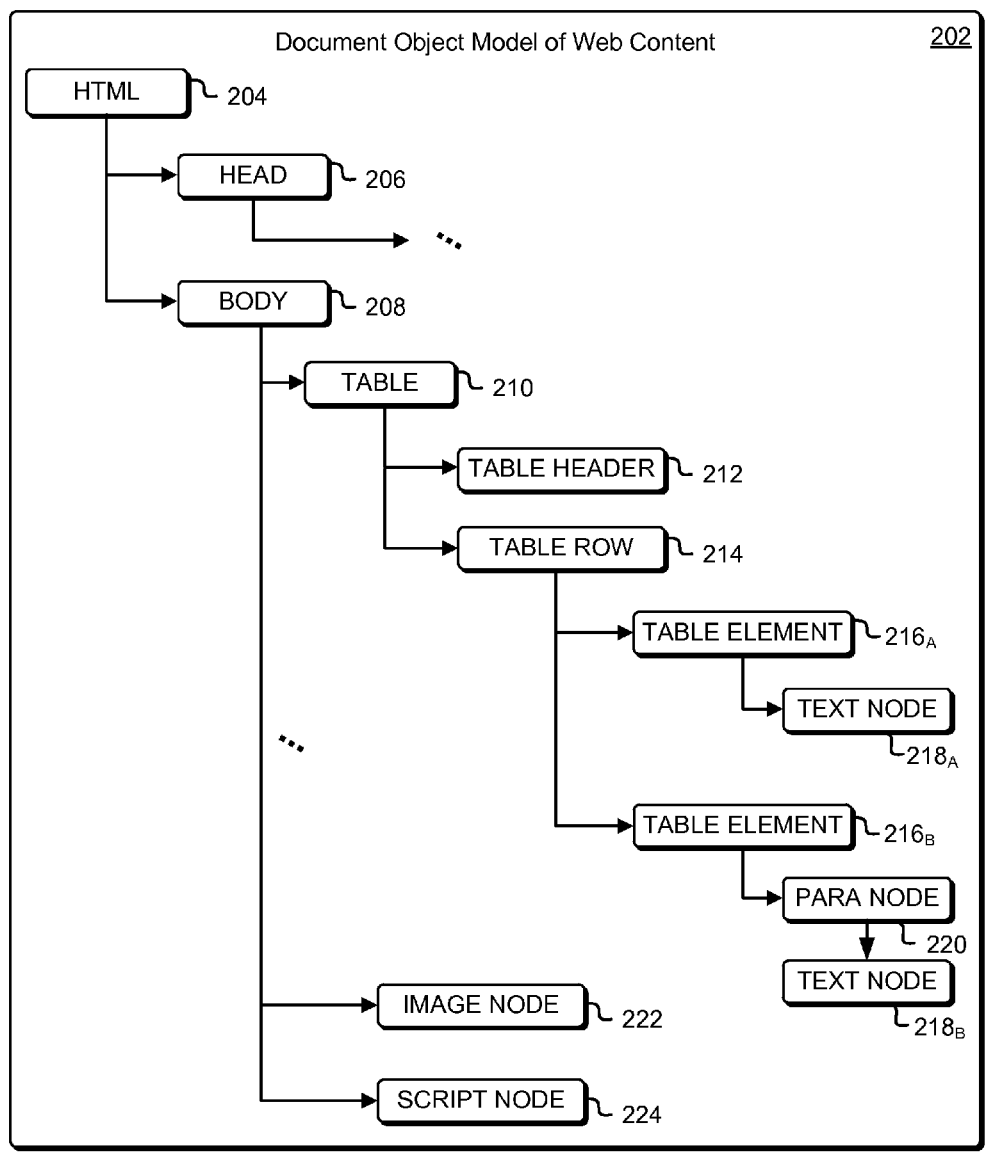
FIG. 2 shows an example of a document object model for web content in accordance with at least one embodiment.

FIG. 2 shows an example of a document object model for web content in accordance with at least one embodiment. The document object model 202 defines a logical structure of the web content. The web content may, for example, be a web page and the document object model 202 may be used to build a document for the web content, whereby the structure of the document may be navigated and elements of content may be added to the document. As described herein, the document object model 202 may be a way of representing any type of information or any type of data. The document object model 202 may have a hierarchal structure that specifies the relationship between nodes. The document object model 202 may include various nodes, such as a document type node. The document type node may, for example, specify a mark-up language used in constructing the document object model 202. The document type node may specify that the document object model 202 pertains to an HTML or XML document. Further, the document object model 202 may specify any number of element nodes, such as a table, script, image, text or paragraph, among others. The document object model 202 additionally specifies comments or processing instructions.

As shown in FIG. 2, the document object model 202 includes a plurality of nodes 204-224, whereby the document object model 202 specifies the relationship between the nodes 204-224 and a hierarchal structure that encompasses the nodes 204-224. The document object model 202 includes a document type node 204 that specifies that the web content document is an HTML document. Further, the document object model 202 also includes a header node 206 and a body node 208. The header node 206 specifies a heading for the node, such as a title or subject, whereby the header node 206 may commence the description of the header of the document. Although not shown in FIG. 2 in order to facilitate illustration, the header node 206 may be a root in a tree-like structure that initiates description of the header, whereby other sub-nodes may be used to complete the description. The body node 208 may be for describing a body of the web content. The body of the document is shown to include a table, an image and a script. The table node 210, image node 222 and script node 224 enable specifying the table, image and script, respectively.

The table node 210 is shown to specify a table header node 212 and a table row node 214. Further, the table row node 214 specifies two table element nodes $216_A$, $216_B$, whereby the first table element node $216_A$ includes a first text node $218_A$ and the second table element node $216_B$ includes a paragraph node 220 having a nested second text node $218_B$. The document object model 202 sets forth a relationship between the nodes 204-224. For example, whereas the first table element node $216_A$ only includes the first text node $218_A$, the second table element node $216_B$ includes the paragraph node 220 nested within which is the second text node $218_B$. In addition to the nodes 204-224 shown in FIG. 2, the document object model 202 may also specify a list, comment, or frame, among others, of the web content.

Figure 3:
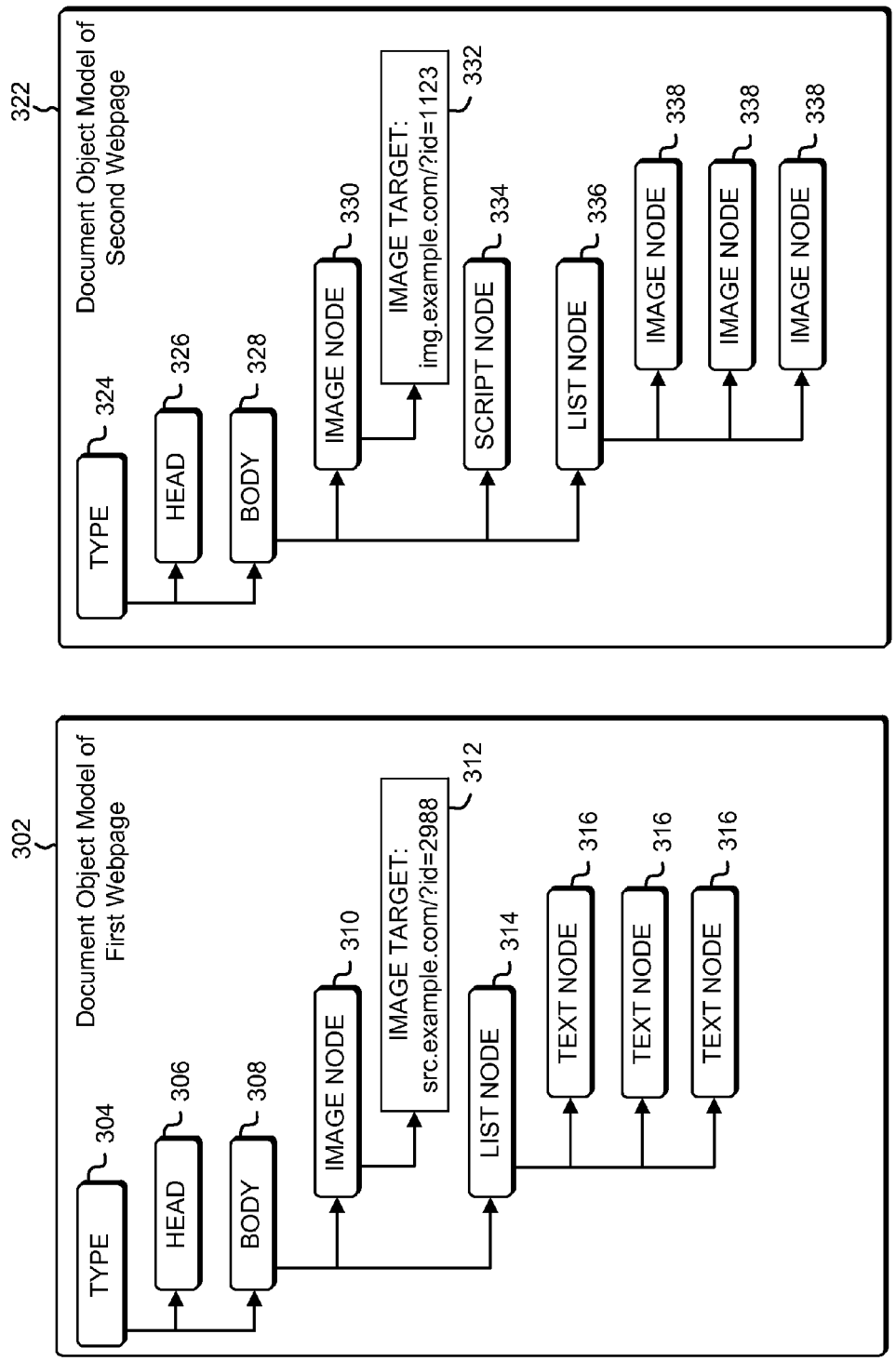
FIG. 3 shows an example of document object models for web content in accordance with at least one embodiment.

FIG. 3 shows an example of document object models for web content in accordance with at least one embodiment. A document object model for a first webpage 302 and a document object model for a second webpage 304 are shown in FIG. 3. The document object model for the first webpage 302 has a hierarchal structure that includes a document type node 304 as a root and a header node 306 and a body node 308 that are ranked lower than the document type node 304. The body node 308 may be a sub-document object model with the document object model for the first webpage 302. The body node 308 includes an image node 310 that may be used to cause an image to be rendered using a web browser. The image node 310 may refer to an image target 312 that is retrieved for rendering, whereby the image target 312 may specify a fully-qualified domain name (FQDN) of the image. Nested within the body node 308 is a list node 314 that includes three text nodes 316.

The document object model for the second webpage 322 also includes a document type node 324 as a root and a header node 326 and a body node 328 that are ranked lower than the document type node 324. The body node 328 includes an image node 320 that refers to an image target 332 that is retrieved for rendering. The image target 332 of the document object model for the second webpage 322 refers to a different fully-qualified domain name source than the image target 312 of the document object model for the first webpage 302. However, there are commonalities between the two fully-qualified domain names that may be used to derive an expression for a permissible source. Unlike the document object model for the first webpage 302, the document object model for the second webpage 322 includes a script node 334. As described herein, a node may be categorized as executable if the node pertains to custom actions that occur upon parsing and may not inherently be specified by a web browsing application or a parser associated with the web browsing application. Some executable nodes may not be subject to parsing or may not be subject to processing or rendering by a parser to interpret the content of the executable nodes. Instead, the executable nodes may be provided for execution by an application. For example, an executable node may include an identity of an application configured to execute instructions associated with the node. Examples of an executable node include a character data (CDATA) section in XML as well as a processing instruction (PI) and entity reference. Further, a CDATA section may include a scrip node as described herein.

The script node 334 may include instructions that are executable on a user device receiving web content of the second webpage. Due to its executable nature, the script node 334 may be used for code injection and may facilitate a cross-site scripting attack. Accordingly, unless a script node is expected to be found in web content, the presence of the script node 334 may indicate that content is malicious. The document object model for the second webpage 322 also includes a list node 336 and nested within the list node 336 are three image nodes 338. The list node 336 of the document object model for the second webpage 322 is different than that of the document object model for the first webpage 302 in that it includes three image nodes 338 as opposed to three text nodes 316.

The document object model for the first webpage 302 and the document object model for the second webpage 304 may be used to generate a document object model template. Further, regardless of the manner in which the document object model template is generated, either of the document object model for the first webpage 302 or the document object model for the second webpage 304 may be evaluated against the document object model template to determine if they are permissible. For example, a document object model template may be generated based at least in part on the document object model for the first webpage 302 and used to evaluate whether the document object model for the second webpage 304 is permissible. The document object model template may capture a structure of the document object model for the first webpage 302 and the relationship between its nodes. Accordingly, the document object model template may specify that permissible web content should have a document object model that includes a head node 306 and a body node 308, whereby the body node 308 includes an image 310 with a certain image target 312 and a list node 314 having three text nodes 316. When compared to the document object model template, the document object model for the second webpage 304 may differ in the fact that its image node 330 has an image target that is different from the document object model template. However, so as not to overly restrict permissible content, the document object model template may specify a broadened expression of a permissible FQDN for the image target (for example, FQDN that is associated with example.com).

The document object model for the second webpage 304 also differs in that it includes the script node 334. Due to the fact that executable script nodes are often used for injecting malicious code in a receiving user device, the presence of the script node 334 may be indicative that the second webpage is impermissible. In various embodiments, if the representative information used to construct the document object model template does not include script nodes, it may not be desirable to broaden the document object model template so as to permit script nodes. The document object model for the second webpage 304 differs in that the list node 336 includes three image nodes 338 as opposed to three text nodes 316. Whereas the number of nodes is accordance with the expected number, the type of nodes that are children nodes of the parent list node 336 is different from what is expected. Accordingly, a document object model template that is constructed based at least in part on the document object model for the first webpage 302 may restrict permissible children nodes of the list node 336 to text nodes. If a less restrictive document object model template is constructed, children nodes that are image nodes may be permissible. It may be sought for the image nodes to be impermissible due to the fact that image nodes may cause the retrieval of an image target, whereby the image target may be associated with a FQDN.

Figure 4:
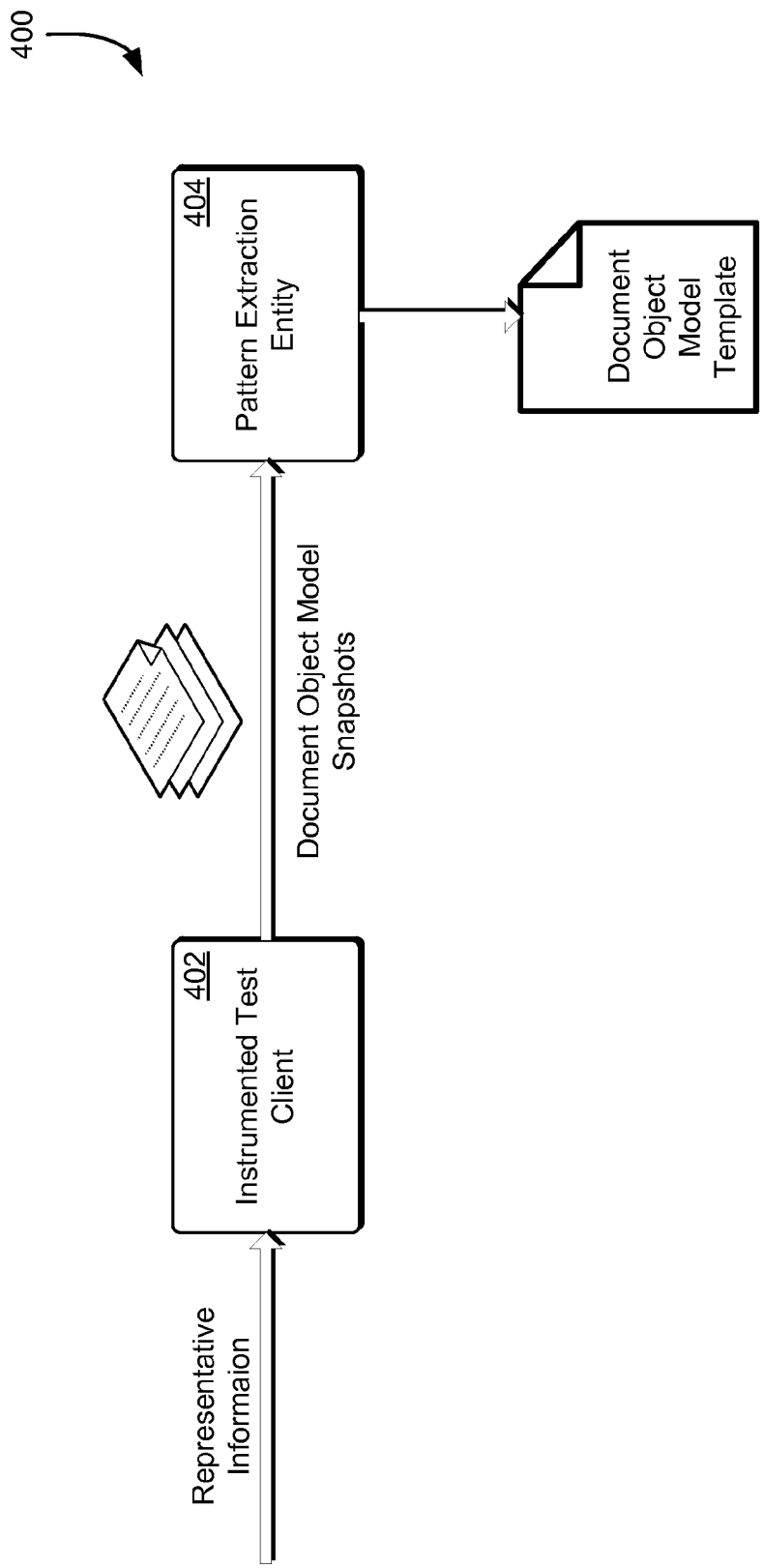
FIG. 4 shows an example of an environment for generating a document object model template in accordance with at least one embodiment.

FIG. 4 shows an example of an environment for generating a document object model template in accordance with at least one embodiment. In the environment 400, representative information for web content is provided to an instrumented test client 402. As described herein, the term web content is used to refer to any information or data distributed over a network, such as a private or public network. Examples of the web content include both webpages and websites that are specified using a code language, such as JavaScript or HyperText Markup Language (HTML), and capable of being rendered using an application, such as a web browser. The representative information may specify a construction of the web content using a markup language or a scripting language, among others. The representative information may be web content that is to be published to a web server and delivered to clients. For example, the representative information may be executed as a website. Further, the representative information may be application code that is developed for testing or a library of application code used to execute a website. The library may be compiled over a historical period of time and may be provided as being indicative of type, nature or size of content pertaining to the website. In various embodiments, the representation information may capture features or attributes of exemplary web content expected to be published. In addition, the representation information may capture a common pattern or a certain style of a website that may be preserved across all webpages of the website. The representative information may convey known code structures or patterns associated with the website, whereby similarly structured website code may be deemed to be safe, non-malicious or unadulterated. In some embodiments, the representative information may represent the range of code structures or patterns used in a website.

The instrumented test client 402 may be a collection of computing resources and/or other resources collectively configured to receive the representative information and generate one or more document object model snapshots based at least in part on the received representative information. As used herein, unless otherwise stated or clear from context, the collection of computing resources may be a computer system program, process, client, server, service, application, module, operating system entity, controlling domain or combinations of these and/or other such computer system entities. The collection of computing resources may be a client and/or a server and in some embodiments may be configured to send and/or receive communications, data, requests and/or other such requests to and/or from other services within the computer system.

The instrumented test client 402 may generate the one or more document object model snapshots periodically, accordingly to a specified schedule or due to the occurrence of a trigger. A document object model snapshot may define a logical structure of a document. As described herein, the term "document" may refer to any structured piece of information. For example, the document may be a webpage described or coded using HTML, Extensible Markup Language (XML) or JavaScript and the document object model snapshot may specify various elements, nodes or content of the document. The document object model snapshot may specify text nodes, scripts nodes or data sections, among others, of the document. The document object model snapshot may describe an element tree of the document and set forth logical relationship between the various tree elements.

As described herein, the document object model snapshots may specify the type of nodes that are utilized in the representative information as well as the relationships among the nodes, such as any parent-child relationships. The types of node may be used to inform a type of action permitted based at least in part on the node. For example, a script node may be executable by a receiving user device. In addition, certain nodes may request access to user session credentials. Furthermore, a node, such as an image node, may cause data to be retrieved by the user device from a target location. Accordingly, due to their capability to induce action, such as executing instruction, accessing user credentials or retrieving data from a location, it is desirable to identify the types of nodes in the document object model snapshots, whereby the document object model snapshots may be used in synthesizing document object model template.

Furthermore, in addition to the type or relationship of nodes, the document object model snapshots may include an indication of the number of nodes of the representative information. The number of nodes may be utilized in determining a permissible number of nodes in further received web content. For example, if the document object model snapshot of representative information includes three script nodes, the document object model snapshot may be used to define a range of a number of permissible script nodes, such as three or less, between two and four or between one and five. Accordingly, the fact that script nodes are used may not be misused by an attacker to inject any number of script nodes in web content.

The instrumented test client 402 may be implemented as a browser plug-in or add-in and may be responsible for accessing web content (for example, a website) and capturing document object model snapshots (for example, at various times). Alternatively, the instrumented test client 402 may be an HTML or JavaScript parser responsible for capturing the snapshots. To capture the full range of a website, the captured document object model snapshots may advantageously encompass various permutations of legitimate or non-malicious modes of operation of a website.

The captured document object model snapshots are provided to a pattern extraction entity 404. The pattern extraction entity 404 may be a collection of computing resources and/or other resources collectively configured to produce one or more document object model templates based at least in part on one or more received document object model snapshots. As used herein, unless otherwise stated or clear from context, the collection of computing resources may be a computer system program, process, client, server, service, application, module, operating system entity, controlling domain or combinations of these and/or other such computer system entities. The collection of computing resources may be a client and/or a server and in some embodiments may be configured to send and/or receive communications, data, requests and/or other such requests to and/or from other services within the computer system.

A document object model template may specify permitted document object model characteristics for a website. The document object model template may specify a location, number, arrangement or relationship of nodes, scripts, data sections, processing instructions, entity references or content elements, among others. The document object model template may specify permissible document object model characteristics. Information represented in the document object model snapshots is used in constructing the document object model template.

The document object model template may specify a permissible structure of a website based at least in part on the received document object model snapshots. The document object model template may summarize features or attributes expected to be found in the web content. To generate the document object model template, the received document object model snapshots may be analyzed and commonalities between the received document object model snapshots may be incorporated as part of the document object model template. It may be important for the document object model template to be over inclusive as opposed to otherwise due to the fact that an over inclusive document object model template is less likely to cause the denial of legitimate or non-malicious web content.

As described herein, the document object model template may be generated based at least in part on one or more document object model snapshots. Further, a constructed document object model template may be updated or modified in accordance with later evaluated document object model snapshots, whereby the document object model template may be used to define or describe permissible web content. The document object model template may limit the type of nodes of permissible web content to those observed in the document object model snapshots. For example, if the document object model snapshots were observed not to include certain types of node elements, the document object model template may specify that these node elements are impermissible of that content including the node elements is impermissible. Examples of the node elements include a node element pertaining to a node field, a script node or a node element that accesses user data, such as access permissions or information related to session credentials. Furthermore, the document object model template may specify a relationship between node elements of permissible content. For example, if the body node of the one or more document object model snapshots include a table node having a specified structure or properties, the document object model template may specify the relationship between the body node and the table node to be a requirement of permissible content.

The document object model template may synthesize permissible content in the alternative, which may be the case when a single statement may not be sufficient to capture varying structures or models of permissible content. However, as described herein it may be advantageous to reduce the size of an expression used to specify permissible or impermissible content. Accordingly, while specifying the document object model template using alternative expressions provides flexibility in defining permissible content, the flexibility may be balanced with an interest in reducing the size of the expression.

The document object model template may also specify a target property expression associated with a node. For example, if a plurality of image nodes in the document object model snapshots have target FQDNs that are variant but have elements in common, the target property expression of the document object model template may be used to capture the common elements of the target FQDNs. As described herein, if a first target FQDN is "src.example.com/?id=2988" and a second target FQDN is "img.example.com/?id=1123", the target property expression may be set to "*.example.com/?id=*", where the symbol "*" represents the wildcard operator.

The document object model template may further specify, for each permissible node type, a number of nodes that are permissible in web content. For example, if the document object model snapshots using which the document object model template is generated include at most three image node, the number of image nodes in permissible web content may be set to a maximum of three or some other range based at least in part on the observed numbers.

The permissible content defined by the document object model template may be defined dynamically and may differ relative to different events. Further, certain sub-trees of the document object model template may be static, whereas other sub-trees may be dynamic and may depend on the occurrence of an event, such as a page reload event or a first render event. A static portion of the document object model template may not change relative to an event, whereas a dynamic portion of the document object model template may be different depending on the occurrence of the event. For example, the document object model template may be specified differently for a page reload event or a first render event than other browsing events. To construct a document object model template based at least in part on one or more document object model snapshots, various path hierarchal paths of the one or more document object model snapshots may be navigated using a mechanism, such as XPath. XPath may permit specifying hierarchal expressions for the document object model template as well as relationships between different parts of the hierarchy. XPath selectors as well as any type of expression may be used to describe a commonality between the one or more document object model snapshots for incorporation in a document object model template. For example, XPath selectors may have a string, number, Boolean, node-set or document fragment expression.

In some embodiments, the document object model template may be a list of rule clauses that specify permitted or denied document features or attributes. The list of rule clauses may be based at least in part on observed features or properties of the document object model snapshots. The rule clauses may be in conjunctive normal form or disjunctive normal form (for example, including "AND" or "OR" statements). Further, a rule clause may comprise one or more sub-rules in conjunctive normal form or disjunctive normal form. The document object model template may be updated as further document object model snapshots are received, whereby the document object model template may be updated in accordance with the received document object model snapshots. For example, as document object model snapshots are received and analyzed, further conjunctive or disjunctive statements may be added to the rule clauses to capture the document object model snapshots.

If a document object model template is constructed for a set of document object model snapshots and a further document object model snapshot is received, the document object model template may be analyzed to determine whether the received document object model snapshot is compliant with the constructed document object model template. If it is determined that the received document object model snapshot is not in compliance with the document object model template, the document object model template or its associated rules may be modified in order to make the received document object model snapshot compliant with the document object model template. A document object model snapshot is compliant with a document object model template if the document object model snapshot is permitted by the document object model template. Further, updating the document object model template may include adding or removing one or more conjunctive or disjunctive statements to the rules or sub-rules of the document object model template.

Further, batch processing may be performed on the document object model snapshots to generate the document object model template. For example, a plurality of more document object model snapshots may be processed to produce the document object model template and when further document object model snapshots are received, a set of rules may be established based at least in part on the further received document object model snapshots. The set of rules may be reconciled with the existing document object model template to produce an updated template. An iterative technique may be used to update a document object model template as new information is derived from received document object model snapshots. With the iterative technique, a least constrained document object model template rules may be obtained.

Any optimization technique may be used in generating the document object model template. For example, to reduce the size or complexity of the document object model template or its associated statements or rule clauses, a penalty may be imposed on the number of clauses or number of items in the document object model template. The penalty may increase as the number of clauses or number of items of the document object model template increases. Imposing the penalty is advantageous in that it results in reducing the size or complexity of the document object model template or the number of statements or rules used to describe the document object model template. Furthermore, the document object model template is optimally broad enough to encompass all observed document object model snapshots, while having a compact description.

To ensure that the document object model template is not simplified to the point that it does not serve as a meaningful description for permitted web content or a meaningful bound on properties associated with permitted web content, a further penalty may be imposed on the number of potential document object model snapshots that are permissible according to the document object model template but which were not used in the evaluation for generating the document object model template. For example, certain webpages may be permissible by the document object model template despite the fact that a document object model snapshot of the webpages was not used in generating the document object model template. Accordingly, the penalty may increase as the number of these webpages increases. The penalties associated with the document object model template may be provided to an optimization function in order to produce an optimum document object model template according to the established constraints. Following generation, the document object model template is provided for use.

Figure 5:
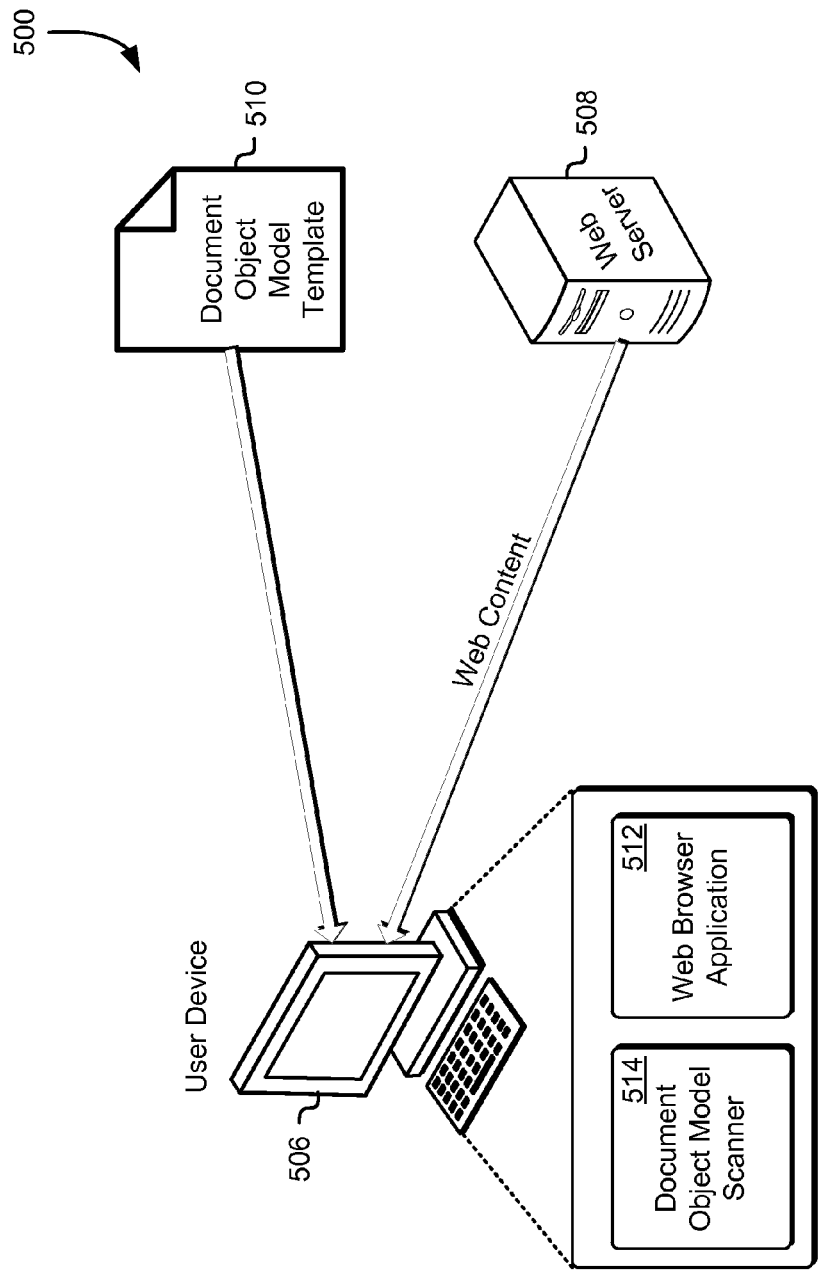
FIG. 5 shows an example of an environment for providing a document object model template for use in accordance with at least one embodiment.

FIG. 5 shows an example of an environment for providing a document object model template for use in accordance with at least one embodiment. In the environment 500, a user device 506 receives web content from a web server 508 and also receives a document object model template 510. The document object model template may be received from the web server 508 or from another entity (not shown).

The user device 506 may be any type of consumer electronics device including a laptop or desktop computer, a tablet, a mobile phone or a smartphone, a smart television, a set-top box or a stream player or a network-enabled digital optical disk player, such as a Blu-ray™ player or digital versatile disc (DVD™) player, among others. The user device 506 may be configured to communicate using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The user device 506 may be equipped with a processor, such as a central processing unit (CPU) or a graphics processing unit (GPU), that provides computing functionality to a user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The user device 506 may also be equipped with one or more input device, such as a touchscreen that responds to a fingertip or a stylus input, a physical keyboard, a digital camera, a microphone, a touchpad or a mouse, among others. In addition, the user device 506 may also be equipped with one or more output devices such as a screen or speakers. The user device 506 may further be equipped with a global positioning system (GPS) circuitry that enables locating the user device 506.

The user device 506 may be equipped with memory, such as dynamic or static memory, whereupon one or more executable instructions may be stored that cause the execution of a web browser application 512. The web browser application 512 may be used to enable the user device to display web content that is written or scripted using HTML, XML, JavaScript and the like. The web browser application 512 may also enable the user to interact with various websites. The user device 506 may also be configured with executable instructions that enable the execution of a document object model scanner 514. The document object model scanner 514 may be configured to evaluate web content in conjunction with the document object model template 510 to determine whether the web content is in accordance with the document object model template 510. Web content that is in accordance with the document object model template 510 may be content that is permissible according to the document object model template 510. As described herein, the document object model template 510 may include one or more rules that specify features or attributes of permissible web content. Web content may be impermissible if certain features or attributes of the web content are explicitly prohibited by the document object model template 510. Further, the web content may be impermissible if certain features or attributes are not explicitly permitted by the document object model template 510.

The document object model scanner 514 may be implemented as an add-in, plugin or component of the web browser application 512. Further, the document object model scanner 514 may be implemented as an application that is separate or independent from the web browser application 512. Following the initiation of a browsing session using the web browser application 512, the user device 506 receives the web content from the web server 508. The document object model scanner 514 may generate a document object model for the received web content. The document object model scanner 514 then evaluate the generated document object model for the web content to determine whether the generated document object model for the received web content is permitted by the document object model template 510. If it is determined that the document object model for the web content is not permitted by the document object model template 510, the document object model scanner 514 may cause the termination of the browsing session. For example, the document object model scanner 514 may send an instruction to the web browser application 512 to cease processing received content from the web server 508. Received web content that is not in accordance with the document object model template 510 may be suspected of being malicious.

Figure 6:
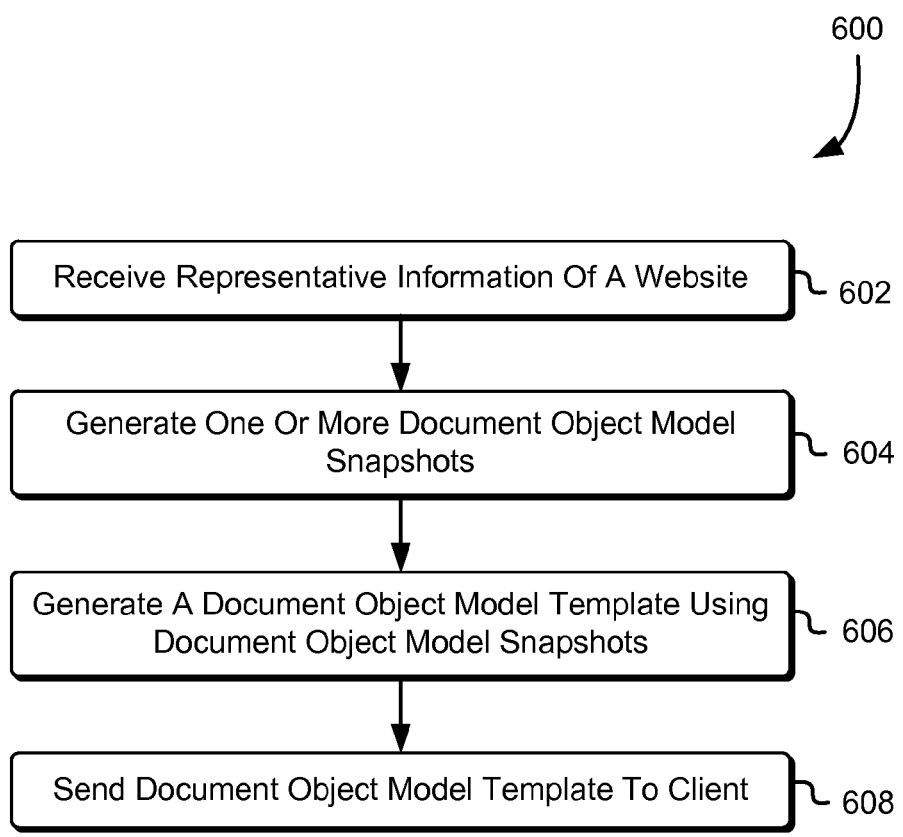
FIG. 6 shows an example of a method for generating a document object model template in accordance with at least on embodiment.

FIG. 6 shows an example of a method for generating a document object model template in accordance with at least on embodiment. In the process 600, an entity, such as the instrumented test client described with reference to numeral 402 in FIG. 4, receives 602 representative information of a website. As described herein, the representative information may be descriptive of one or more webpages of the website. The representative information may be written or transcribed using HTML or JavaScript, among others. The representative information may encompass a range of potential implementations of the website. The entity then generates 604 one or more document object model snapshots based at least in part on the received representative information. A document object model snapshot of the one or more document object model snapshots may capture information required for generating a template. For example, a document object model snapshot for a webpage may capture layout, header or element information, among others, for the webpage. In addition, the document object model snapshot may not capture or ignore information that is particular for the webpage but that be expected to be found in other similar webpages. For example, a product image or price may be excluded from the document object model snapshot as other similar webpages (pertaining to another product) may not include the same product image or price. The document object model snapshot may as detailed as to capture all the specifics of a webpage but may instead include higher level information that captures features found in the webpage or features expected to be found in similar webpages.

Following generating the one or more document object model snapshots, an entity, such as the pattern extraction entity described with reference to numeral 404 in FIG. 2, generates a document object model template based at least in part on the one or more document object model snapshots. The document object model template may be used to specify features or attributes of a permissible webpage as extracted from the document object model snapshots. For example, if a certain header is found to be included in all document object model snapshots, the document object model template may specify that the feature should be included in all permissible webpages. Furthermore, if a first portion of the document object model snapshots had a first feature and a second portion of the document object model snapshots had a second feature that is different from the first feature, the document object model template may specify that a permissible webpage has either feature. If a webpage does not include either feature, the webpage may be deemed impermissible.

The entity then sends the document object model template to a client. As described herein, the client may be a user device, such as a tablet or smartphone, and the document object model template may be sent over a network, such as the Internet. The document object model may be provided by the same location, for example, web server, from which content for a website is received or from a different location. For example, the document object model template may conventionally be stored at a known location as identified by a uniform resource locator (URL). A web browsing application may be configured to retrieve the document object model template for a website from a particular location upon the initiation of a browsing session that accesses the website. For example, the document object model template may be retrieved in a similar manner as a favorite icon or a website icon is retrieved.

Figure 7:
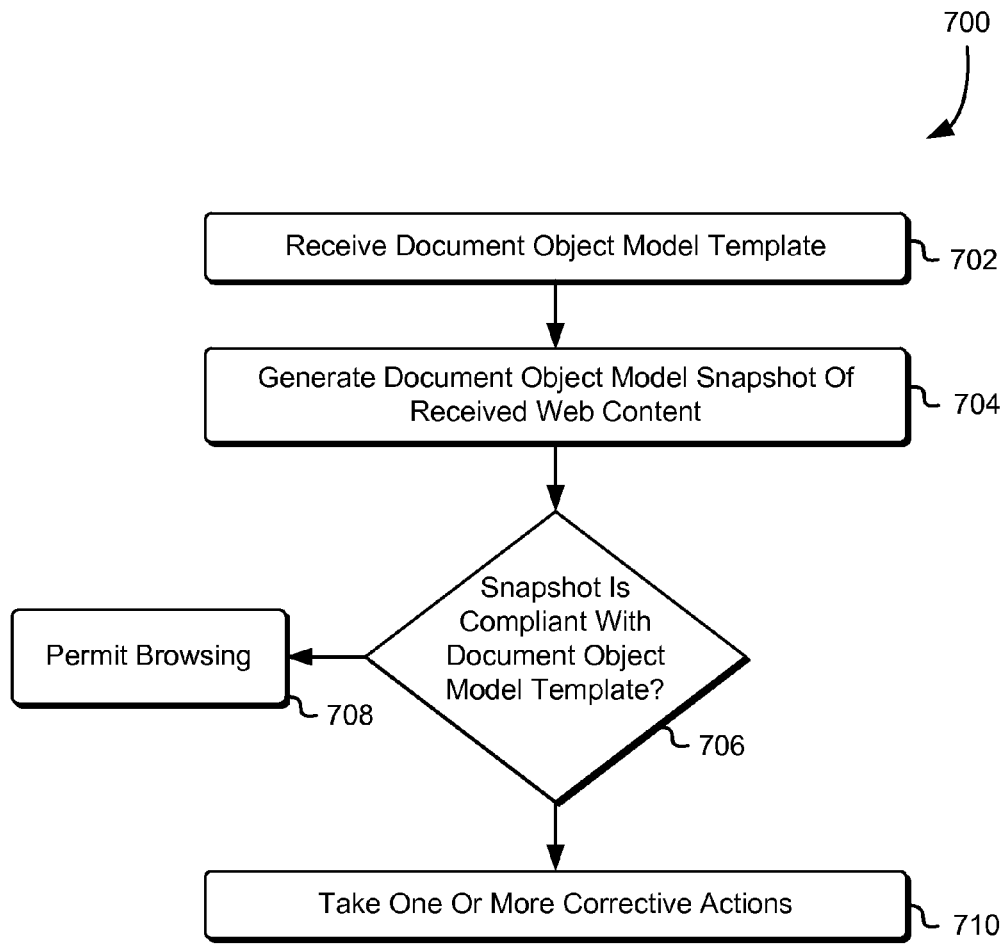
FIG. 7 shows an example of a method for evaluating received web content based at least in part on a document object model template in accordance with at least one embodiment.

FIG. 7 shows an example of a method for evaluating received web content based at least in part on a document object model template in accordance with at least one embodiment. In the process 700, a client web browsing application, such as the web browsing application described with reference to numeral 512 in FIG. 5, receives a document object model template for a website. The document object model template may be received due to the initiation of a browsing session that includes receiving web content from the website. The web browsing application then generates 704 a document object model snapshot of the web content as described herein. The web browsing application determines 706 whether the generated document object model snapshot is in accordance with or compliant with the received document object model template.

If the web browsing application determines that the generated document object model snapshot is compliant with the document object model template, the web browsing application permits 708 browsing the website. If, on the other hand, the web browsing application determines that the generated document object model snapshot is not compliant with the document object model template, malicious activity may be suspected to be taking place. The received web content may be deemed to be different than content expected to be received from the website. Accordingly, it may be suspected that malicious content, such as spyware or adware scripts, may have been inserted in the web content. The web browsing application may take 710 one or more corrective actions in response to the determination. For example, the web browsing application may cause the browsing session to be terminated or may cease receiving content from the website. Furthermore, the web browsing application may only execute content if the content has been determined to be compliant with the document object model template for the website. In, the web browsing application may cause a notification to be sent to a website administrator to alert of the detection of the potential malicious activity. The document object model template may include a uniform resource locator (URL). The user device or the web browsing application may send a response or a notification to the URL indicating that received web content was identified as being not permissible per the document object model template.

Figure 8:
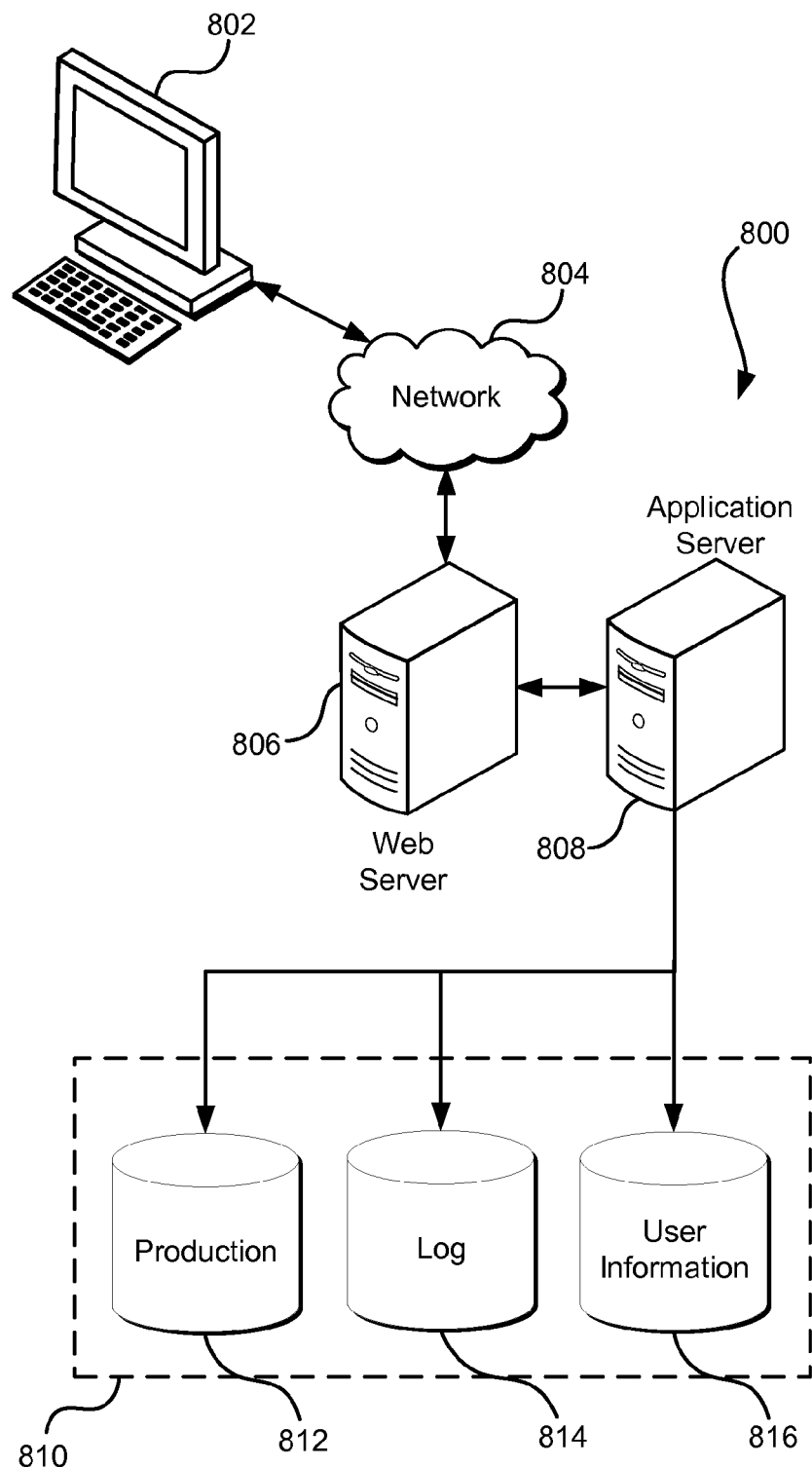
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for detecting malicious content, comprising:
under the control of one or more computer systems configured with executable instructions,
generating a plurality of document object model snapshots wherein:
the plurality of document object model snapshots comprises a first snapshot from a first webpage and a second snapshot from a second webpage, the first webpage and the second webpage identified via different domain names; and
each document object model snapshot of the plurality of document object model snapshots represents a logical structure of one or more node elements of a respective webpage;
generating a document object model template based at least in part on the plurality of document object model snapshots, the document object model template specifying a logical structure of permissible web content, the logical structure of the permissible web content including a plurality of node elements, the document object model template further specifying a node type associated with one or more node elements of the plurality of node elements and a hierarchal relationship between the plurality of node elements, generating the document object model template including:
analyzing the plurality of document object model snapshots to identify commonalities between the first snapshot and the second snapshot; and
incorporating the identified commonalities in the document object model template; and
sending the document object model template to a user device for use in evaluating further web content.

2. The computer-implemented method of claim 1, wherein the node type of a node element of the one or more node elements specifies whether the node element is an executable node.

3. The computer-implemented method of claim 1, wherein the hierarchal relationship between the plurality of node elements is expressed as an XPath expression.

4. The computer-implemented method of claim 1, wherein the identified commonalities are represented by one or more conjunctive or disjunctive normal form statements.

5. The computer-implemented method of claim 1, wherein:
the method further comprises:
testing the document object model template to determine whether the plurality of document object model snapshots are permissible according to the document object model template; and
on a condition that a document object model snapshot of the plurality of document object model snapshots is not permissible, adjusting the document object model template to make the document object model snapshot permissible; and
the document object model template is sent to the user device on a condition that the plurality of document object model snapshots are permissible according to the document object model template.

6. A system comprising:
at least one computing device configured to implement one or more services, wherein the one or more services are configured to:
receive information that represents web content, the web content associated with a plurality of distinct webpages of a website, the distinct webpages identified using different domain names;
analyze the information to identify commonalities among the plurality of distinct webpages of the website;
generate a document object model template specifying a structure of permissible web content, the document object model template being generated based at least in part on the identified commonalities; and
provide the document object model template to a user device for determining whether further web content is permissible.

7. The system of claim 6, wherein the document object model template further specifies a number or type of a plurality of node elements and a hierarchal relationship between the plurality of node elements in the structure of the permissible web content.

8. The system of claim 6, the document object model template includes an indication of whether an executable node element is permissible.

9. The system of claim 6, wherein the document object model template specifies a target property of a node element.

10. The system of claim 6, wherein generating the document object model template further includes utilizing an optimization algorithm to reduce a complexity of the document object model template.

11. The system of claim 10, wherein the optimization algorithm is further configured to penalize increasing a size of the document object model template or increasing a number of webpages permissible by the document object model template.

12. The system of claim 6, wherein generating the document object model template further includes:
generating a plurality of document object model snapshots based at least in part on the information; and
generating the document object model template based at least in part on the plurality of document object model snapshots.

13. The system of claim 12, wherein:
the one or more services are further configured to:
test the document object model template to determine whether the plurality of document object model snapshots are permissible according to the document object model template; and
on a condition that a document object model snapshot of the plurality of document object model snapshots is not permissible, adjust the document object model template to make the document object model snapshot permissible according to the document object model template; and
the document object model template is provided on a condition that the plurality of document object model snapshots are permissible according to the document object model template.

14. A non-transitory computer-readable storage medium having stored thereon instructions that, when executed by one or more processors of a computer system, cause the computer system to:
obtain information representative of web content, the web content including webpage content from multiple pages of a website that are identified with different domain names;
analyze the information to identify commonalities among the multiple pages of the website identified with different domain names;

generate, based at least in part on the identified commonalities between the multiple pages of the website, a document object model template specifying a structure of permissible web content; and provide the document object model template to a user device for use in evaluating further web content.

15. The non-transitory computer-readable storage medium of claim 14, wherein the document object model template specifies permitted document-object-model characteristics for webpages of the website.

16. The non-transitory computer-readable storage medium of claim 14, wherein the document object model template further specifies a number or type of a plurality of node elements and a hierarchal relationship between the plurality of node elements in the structure of the permissible web content.

17. The non-transitory computer-readable storage medium of claim 14, wherein the document object model template specifies an executable node element.

18. The non-transitory computer-readable storage medium of claim 14, wherein the document object model template specifies a target property of a node element.

19. The non-transitory computer-readable storage medium of claim 14, wherein the instructions that cause the computer system to generate the document object model template, when executed by the one or more processors, further cause the computer system to generate the document object model template to have lower complexity than a previous document object model template.

20. The non-transitory computer-readable storage medium of claim 14, wherein:

the instructions, when executed by the one or more processors, further cause the computer system to identify commonalities of the pages of the website; and the document object model template is based at least in part on the identified commonalities.

21. The non-transitory computer-readable storage medium of claim 14, wherein the instructions that cause the computer system to generate the document object model template, when executed by the one or more processors, cause the computer system to generate the document object model template based at least in part on a plurality of document object model snapshots obtained from the information representative of web content.

22. The non-transitory computer-readable storage medium of claim 14, wherein the instructions further comprise instructions that, when executed by the one or more processors, cause the computer system to:

test the document object model template to determine whether a plurality of document object model snapshots are permissible according to the document object model template; and adjust the document object model template to make the document object model snapshot permissible according to the document object model template.

* * * * *